A. SCHMIDT.
TRANSMISSION MECHANISM.
APPLICATION FILED SEPT. 14, 1914.
1,279,592.
Patented Sept. 24, 1918.
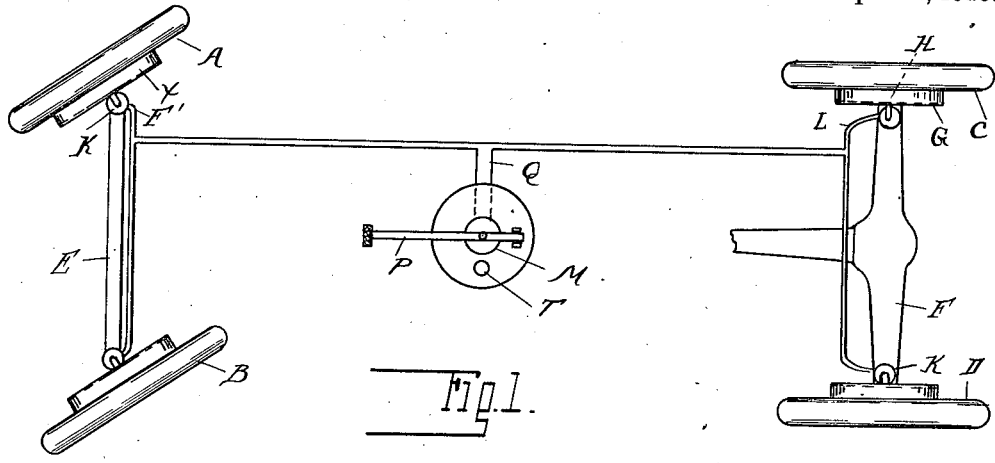
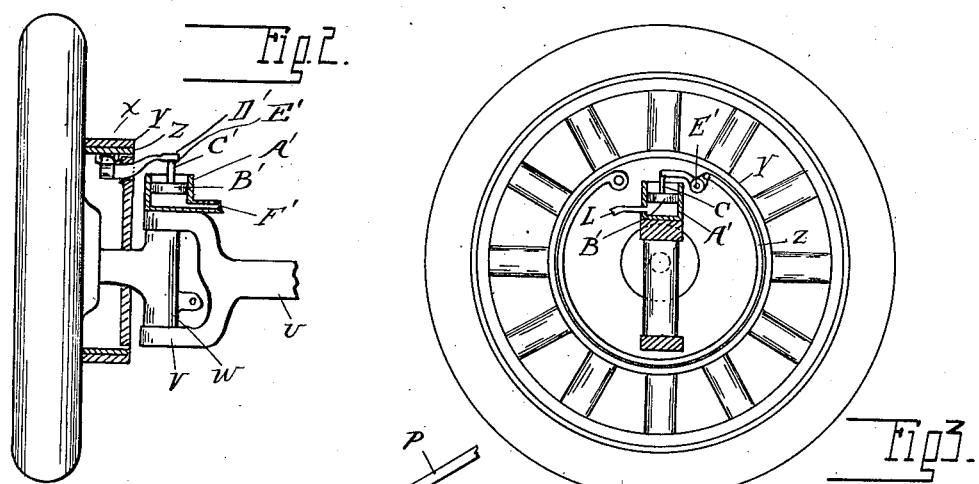
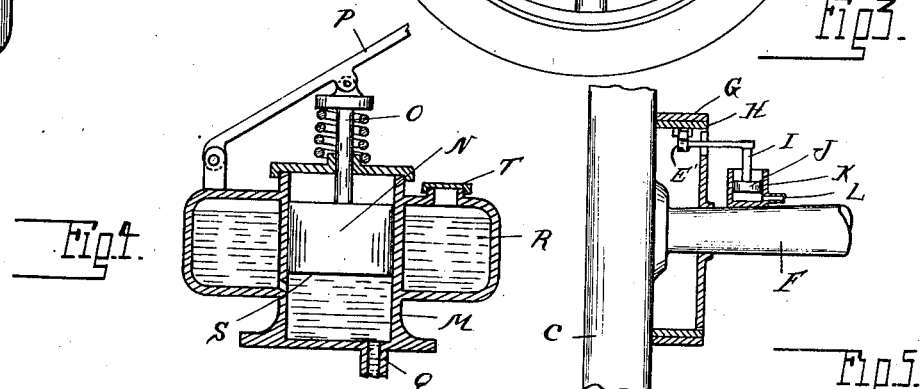
WITNESSES:
INVENTOR
Albert Schmidt
BY
ATTORNEYS

UNITED STATES PATENT OFFICE.

ALBERT SCHMIDT, OF FLINT, MICHIGAN, ASSIGNOR OF ONE-HALF TO ALBERT J. CHAMPION, OF FLINT, MICHIGAN.

TRANSMISSION MECHANISM.

1,279,592.　　　　Specification of Letters Patent.　　Patented Sept. 24, 1918.

Application filed September 14, 1914.　Serial No. 861,598.

*To all whom it may concern:*

Be it known that I, ALBERT SCHMIDT, a citizen of the Republic of France, residing at Flint, in the county of Genesee and State of Michigan, have invented certain new and useful Improvements in Transmission Mechanism, of which the following is a specification, reference being had therein to the accompanying drawings.

The invention relates to transmission mechanism, and resides in the peculiar construction, arrangement and combinations of parts as will more fully hereinafter appear.

While the invention may be employed for operating various devices, it is especially applicable to vehicle brakes and I will, therefore, illustrate and describe the invention as embodied in the brake mechanism of a motor vehicle, though I do not desire to limit the protection to this particular use.

In the drawings,—

Figure 1 is a diagrammatic plan view of a brake mechanism of a motor vehicle embodying the invention;

Fig. 2 is an enlarged view of a steering knuckle and wheel with my improvement applied thereto;

Figs. 3 and 4 illustrate details of construction; and

Fig. 5 is an enlarged view of a portion of the rear axle and a wheel with my improvement applied thereto.

In a brake for motor vehicles it is very desirable to provide a suitable transmission mechanism between the point of control for the operator and the brake proper which will readily equalize for any inequalities or wear upon the brakes; also to provide a simple and efficient transmission mechanism that will automatically take up wear between the parts; further, to have a transmission mechanism between the point of control for the operator and the brake that is positive in action and will not readily get out of order, due to wear or the like. With my improved construction a fluid transmission is employed between the point of control for the operator and the brake-bands. Referring to the one embodiment of the invention shown in the drawings, A and B designate the front wheels of the motor vehicles and C D the rear wheels. E is the front axle and F the rear axle. The wheels C and D are shown as provided with brake drums G and bands H, of any standard construction. Attached to each of the brake bands is a rod I of a piston J that is arranged within a cylinder K. Connected with the cylinder K below the piston J is a conduit L that leads to a cylinder M. N is a piston within the cylinder M, which is connected in any suitable manner to mechanism under control of the operator. In the particular structure illustrated the rod O of the piston M is attached to a pedal lever P. As shown in Fig. 1 the conduits L leading from the cylinders K communicate with a main conduit Q that is connected to the cylinder M.

With the construction so far described, when it is desired to apply the brakes the pedal lever P is depressed and the piston N and cylinder M act as a hydraulic pump to force the fluid contained in the cylinder M to the cylinders K, which will move the pistons J outwardly and apply the brakes. During this operation any inequality in the movement of the piston J due to inaccuracy in assembling the structure or wear between the brake-band and drum or other parts, is automatically taken care of, since one of the pistons J would be free to move independently of the other until the pressure of the fluid in the cylinders K became equalized.

The fluid employed for the hydraulic pump preferably is oil, and in order that sufficient fluid may be at all times maintained in the system the latter is provided with a container R which communicates with the interior of the cylinder M when the piston N is in its uppermost position, as indicated at S. By this arrangement any leakage or the like is readily taken care of. T is a filler for the container R to allow the latter to be supplied with oil from time to time.

In the construction illustrated I also provide the front or steering wheels with brakes. Thus E is the front axle having the usual bifurcated bearings V to which are pivotally connected the steering spindles W. Each of the front wheels is provided with a brake head X mounted on the steering spindle and having associated therewith a brake drum Y attached to the wheel. Mounted upon the brake head is a brake-band Z. In order to operate the brake without interference with the turning of the wheel in steering, a cylinder A' is mounted upon the bearing V in axial alinement with the pivot of the steering spindle. Arranged in the cylinder A' is a piston B' having a rod C' that is connected by a suitable lever D' with the brake mechanism. The lever D' is pivoted at E' to the upper end of the rod C'. Thus upon the turning of the wheel the lever D' is free to turn about the pivot E'.

Connected to each of the cylinders A' is a conduit F', and these conduits communicate with the main conduit that leads to the hydraulic pump. In the structure shown the conduits F' lead to the main conduit Q.

By the construction just described it will be readily apparent that the braking action in no way interferes with the steering mechanism.

I do not desire to limit my protection to the particular structure illustrated, since the invention not only may be embodied in various specific constructions, but also—as before stated—the power transmission mechanism may be employed for uses other than in connection with brakes.

What I claim as my invention is:—

The combination with a wheel provided with a brake drum, a brake-band within said drum, of a bifurcated bearing, a spindle pivotally connected to said bifurcated bearing and wheel, a cylinder mounted upon said bearing in axial alinement with the pivotal connection between said bearing and spindle, a piston within said cylinder, a rod connected to said piston, a second rod rotatively connected to said first-mentioned rod and attached to said brake-band, and a hydraulic motor connected to said cylinder.

In testimony whereof I affix my signature in presence of two witnesses.

ALBERT SCHMIDT.

Witnesses:
A. W. LEDBETER,
B. D. YUNHARD.